US010802273B2

(12) United States Patent
Nakayama et al.

(10) Patent No.: US 10,802,273 B2
(45) Date of Patent: Oct. 13, 2020

(54) COMBINER AND HEAD-UP DISPLAY DEVICE USING SAME

(71) Applicant: Panasonic Intellectual Property Management Co., Ltd., Osaka (JP)

(72) Inventors: Kenji Nakayama, Osaka (JP); Yukio Hibino, Osaka (JP); Akito Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 191 days.

(21) Appl. No.: 16/217,029

(22) Filed: Dec. 11, 2018

(65) Prior Publication Data

US 2019/0113748 A1  Apr. 18, 2019

Related U.S. Application Data

(63) Continuation of application No. PCT/JP2017/027203, filed on Jul. 27, 2017.

(30) Foreign Application Priority Data

Aug. 5, 2016 (JP) ................................. 2016-154900

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *B60K 37/02* (2013.01);
(Continued)

(58) Field of Classification Search
CPC .. G02B 27/0101; G02B 6/0018; G02B 6/002; G02B 6/0028; G02B 6/006;
(Continued)

(56) References Cited

U.S. PATENT DOCUMENTS 5,066,102 A * 11/1991 Hirano ................. G02B 5/0808
359/630
2017/0235030 A1    8/2017 Tanaka et al.

FOREIGN PATENT DOCUMENTS

WO    2016/056617    4/2016

OTHER PUBLICATIONS

International Search Report of PCT application No. PCT/JP2017/027203 dated Oct. 24, 2017.

* cited by examiner

*Primary Examiner* — Brandi N Thomas
(74) *Attorney, Agent, or Firm* — Greenblum & Bernstein, P.L.C.

(57) ABSTRACT

The combiner has a reflecting surface that reflects incident light. When the incident light has an incident angle in a range from 0° to 25°, inclusive, defined as a first value, in a wavelength range from 400 nm to 700 nm, inclusive, the upper limit wavelength of a wavelength range having a reflectance of 90% or more of the reflectance peak of the incident light is shorter than 700 nm. When the incident angle takes a second value in a range from 60° to 85°, inclusive, in the wavelength range from 400 nm to 700 nm, inclusive, the reflectance peak of an S-wave component contained in the incident light has a wavelength shorter than 570 nm.

10 Claims, 5 Drawing Sheets

(51) Int. Cl.
*G02B 5/08* (2006.01)
*B60K 35/00* (2006.01)
*B60K 37/02* (2006.01)

(52) U.S. Cl.
CPC ............... *G02B 5/08* (2013.01); *G02B 27/01* (2013.01); *G02B 27/0149* (2013.01); *G02B 27/14* (2013.01); *B60K 2370/334* (2019.05); *G02B 2027/0141* (2013.01)

(58) Field of Classification Search
CPC .... G02B 6/0068; G02B 6/0076; G02B 6/003; G02B 6/005; G02B 6/0065; G02B 6/0088; G02B 5/26; G02B 2027/0118; G02B 2027/012; G02B 27/017; G02B 6/0036; G02B 6/0078; G02B 6/0085; G02B 6/1225; G02B 2027/0112; G02B 2027/0194; G02B 27/01; G02F 2001/133616; G02F 1/19; G02F 1/133345; G02F 1/13338; G02F 1/1334; G02F 1/133526; G02F 1/133553; G02F 1/133711; G02F 1/134363; G02F 1/13454; G02F 1/1347; G02F 1/136259; G02F 1/1368; G02F 2001/133521; G02F 2001/133638; G02F 2001/13478; G02F 2201/34; G02F 2202/104; G02F 1/133509; G02F 1/133536; G02F 1/13363

See application file for complete search history.

FIG. 3A
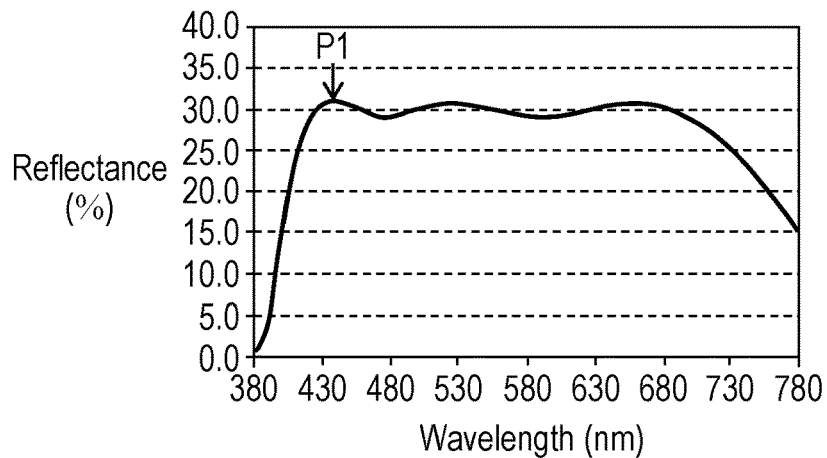
FIG. 3B
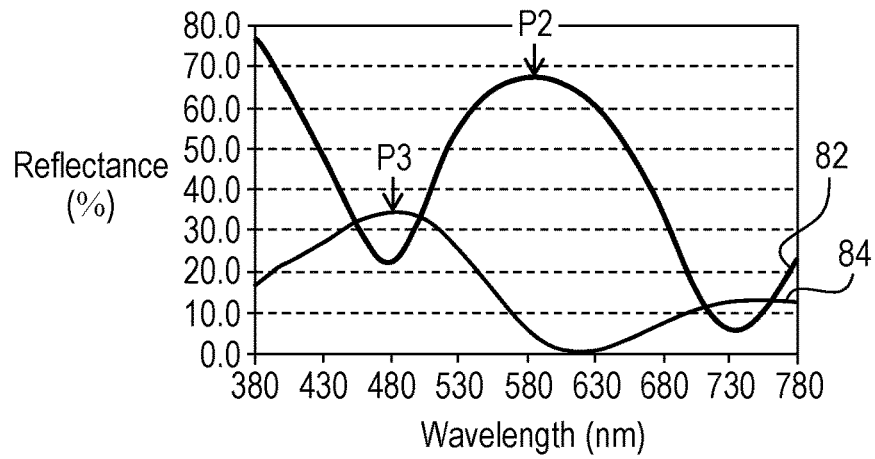
FIG. 3C
| Layer No. | Material | Refractive Index | Physical Thickness (nm) |
|---|---|---|---|
| Base | Resin | 1.53 | — |
| 1 | $SiO_2$ | 1.46 | 162 |
| 2 | $Ta_2O_5$ | 2.16 | 101 |
| 3 | $SiO_2$ | 1.46 | 115 |
| 4 | $Ta_2O_5$ | 2.16 | 26 |
| 5 | $SiO_2$ | 1.46 | 135 |
| 6 | $Ta_2O_5$ | 2.16 | 47 |
| 7 | $SiO_2$ | 1.46 | 120 |
| Medium | air | 1.00 | — |

FIG. 4A
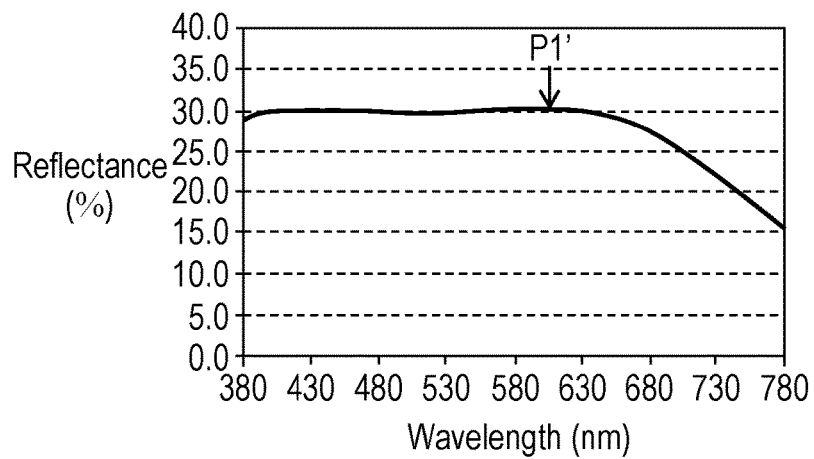
FIG. 4B
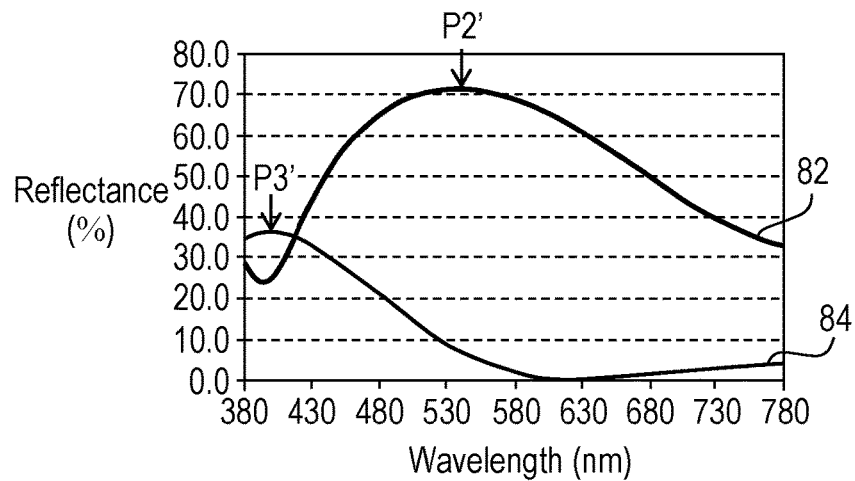
FIG. 4C
| Layer No. | Material | Refractive Index | Physical Thickness(nm) |
|---|---|---|---|
| Base | Resin | 1.53 | — |
| 1 | $SiO_2$ | 1.46 | 402 |
| 2 | $Ta_2O_5$ | 2.16 | 54 |
| 3 | $SiO_2$ | 1.46 | 81 |
| 4 | $Ta_2O_5$ | 2.16 | 57 |
| 5 | $SiO_2$ | 1.46 | 78 |
| Medium | air | 1.00 | — |

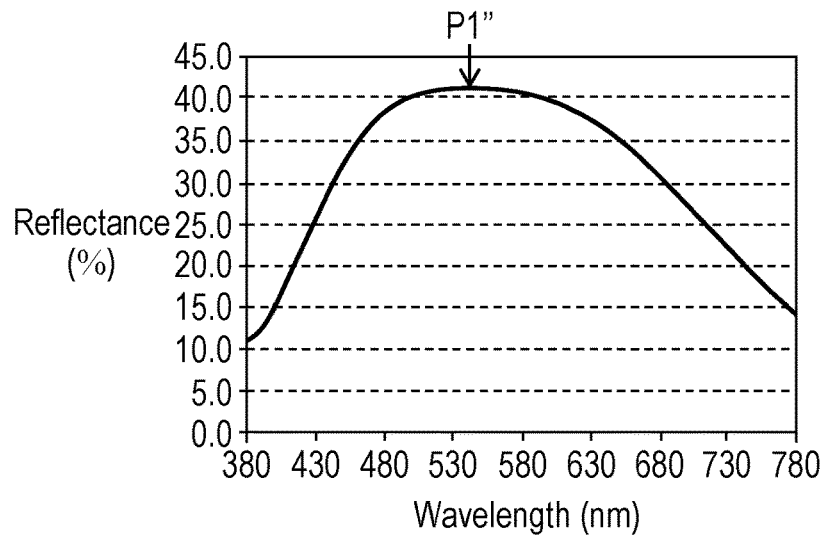
FIG. 5A
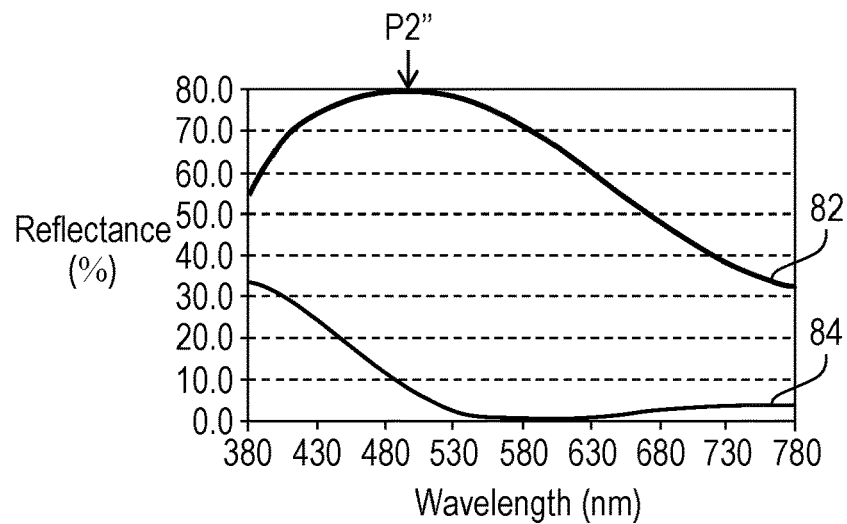
FIG. 5B
FIG. 5C
| Layer No. | Material | Refractive Index | Physical Thickness (nm) |
|---|---|---|---|
| Base | Resin | 1.53 | — |
| 1 | $SiO_2$ | 1.46 | 191 |
| 2 | $Ta_2O_5$ | 2.16 | 52 |
| 3 | $SiO_2$ | 1.46 | 91 |
| 4 | $Ta_2O_5$ | 2.16 | 52 |
| 5 | $SiO_2$ | 1.46 | 55 |
| Medium | air | 1.00 | — |

COMBINER AND HEAD-UP DISPLAY DEVICE USING SAME

CROSS-REFERENCE TO RELATED APPLICATIONS

This application is a continuation of the PCT International Application No. PCT/JP2017/027203 filed on Jul. 27, 2017, which claims the benefit of foreign priority of Japanese patent application No. 2016-154900 filed on Aug. 5, 2016, the contents all of which are incorporated herein by reference.

BACKGROUND

1. Technical Field

The present disclosure relates to a combiner that reflects a part of incident light and also relates to a head-up display device equipped with the combiner.

2. Description of the Related Art

A head-up display (hereinafter, may be referred to an HUD) device is used for showing operating information for car drivers and airplane pilots. The HUD device projects information such that the information overlaps with an image of the driver's view through the windshield. Therefore, the HUD device needs not only high transmittance so that the driver clearly sees the view ahead but also high reflectance so that the driver clearly sees a reflection image. However, transmittance and reflectance have a "trade-off" relation. A combiner improves reflectance, keeping within legal restraints about transmittance (for example, see International Publication No. 2016/056617).

SUMMARY

The present disclosure provides a technique for suppressing emission of colored reflection light from a combiner.

A combiner of an aspect of the present disclosure has a reflecting surface that reflects incident light. According to the combiner, when the incident angle of the incident light takes a first value in a range from 0° to 25°, inclusive, in a wavelength range from 400 nm to 700 nm, inclusive, the average value of reflectance of the incident light is 30% or greater, and the upper-limit wavelength of a wavelength range having a reflectance of 90% or more of a reflectance peak of the incident light is shorter than 700 nm. Besides, when the incident angle of the incident light takes a second value in a range from 60° to 85°, inclusive, in the wavelength range from 400 nm to 700 nm, inclusive, a reflectance peak of a S-wave component of the incident light has a wavelength shorter than 570 nm.

Another aspect of the present disclosure is a head-up display device. The device has a display that emits display light, a reflecting member that reflects the display light, and the aforementioned combiner into which the light reflected by the reflecting member is fed as incident light.

BRIEF DESCRIPTION OF DRAWINGS

FIG. 3A shows reflection characteristics at incident angle α of 0° of a combiner as a comparative device to the combiner of the exemplary embodiment of the present disclosure, the reflection characteristics showing a relation between reflectance with respect to incident light and wavelength of the incident light.

FIG. 3B shows reflection characteristics at incident angle α of 70° of the comparative combiner, the reflection characteristics showing a relation between reflectance with respect to the incident light and wavelength of the incident light.

FIG. 3C shows a structure of a semi-transmitting film of the comparative combiner having reflection characteristics shown in FIG. 3A and FIG. 3B.

FIG. 4A shows reflection characteristics at incident angle α of 0° of the combiner of the exemplary embodiment of the present disclosure, the reflection characteristics showing a relation between reflectance with respect to incident light and wavelength of the incident light.

FIG. 4B shows reflection characteristics at incident angle α of 70° of the combiner of the exemplary embodiment of the present disclosure, the reflection characteristics showing a relation between reflectance with respect to the incident light and wavelength of the incident light.

FIG. 4C shows a structure of a semi-transmitting film of the combiner having reflection characteristics shown in FIG. 4A and FIG. 4B.

FIG. 5A shows reflection characteristics at incident angle α of 0°, when average reflectance is set to 35% in the combiner of the exemplary embodiment of the present disclosure.

FIG. 5B shows reflection characteristics at incident angle α of 70°, when average reflectance is set to 35% in the combiner of the exemplary embodiment of the present disclosure.

FIG. 5C shows a structure of a semi-transmitting film of the combiner having reflection characteristics shown in FIG. 5A and FIG. 5B.

DETAILED DESCRIPTION OF PREFERRED EMBODIMENTS

Prior to describing an exemplary embodiment of the present disclosure, problems in a device of the related art are described.

While driving, reflection of an HUD device into the windshield is a nuisance to the driver's view. When the HUD device has a combiner, the driver's view is further interrupted by the reflection of the combiner into the windshield. Further, the reflection seen from the driver varies as change in the relative position and relative angle between the windshield and the HUD device. According to an HUD device using a combiner, generally, only the optical system in the HUD device is designed so as to have an optimum arrangement. However, a problem occurs in a situation in which sunlight coming through the windshield diffuses on the housing of the HUD device. The diffused light reflects off the combiner and further reflects off the windshield, then coming to the driver. The light, as it is colored, becomes a nuisance to the driver's view.

The head-up display (HUD) device is disposed on the instrumental panel; the combiner is disposed on the inner side of the windshield seen from the driver's seat. The display light from the display of the HUD device is reflected by a reflecting member and is fed into the combiner, which forms a virtual image on the combiner. The driver sees the virtual image containing information as if it is shown on the windshield.

When sunlight comes into the car through the windshield, it reflects off the housing of the HUD device and then reflects off the combiner. In the reflection at the housing, the sunlight is separated into an S-wave component and a P-wave component; further, in the reflection at the combiner, the S-wave component becomes yellow while the P-wave component becomes blue. The blue P-wave component mostly goes outside of the car through the windshield. However, the yellow S-wave component is reflected by the windshield, by which yellow reflection of a combiner axis and a cover of the housing of the HUD device interrupts the driver's view. The structure described below addresses the problem.

Hereinafter, the HUD device of an exemplary embodiment of the present disclosure is described. Throughout the description, the wordings 'parallel' and 'perpendicular' may be not mentioned in a strict sense; they may contain the margin of error. Similarly, the wording 'substantially (the same)' means the same in an approximate range.

Figure 1:
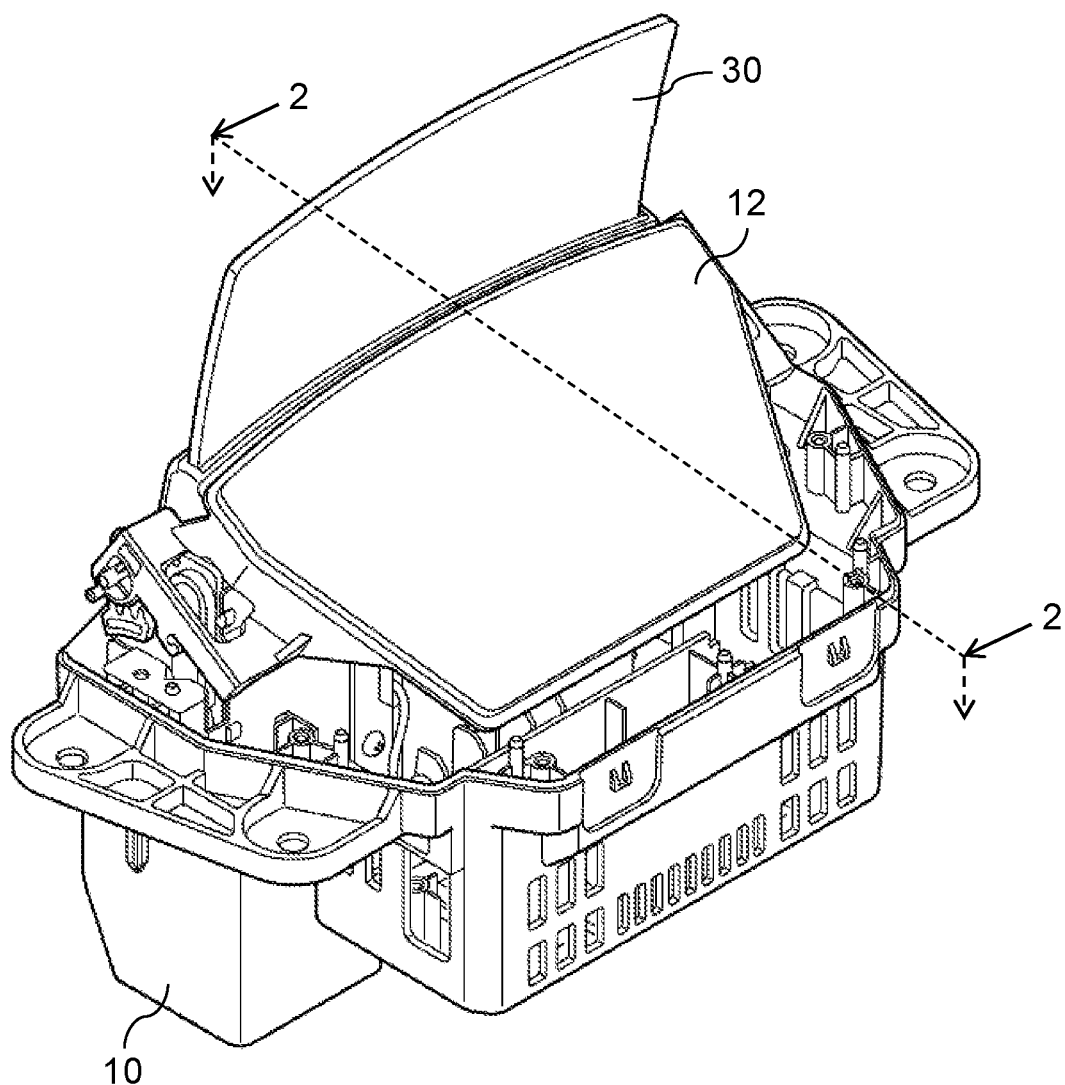
FIG. 1 is an external view showing a structure of a head-up display device having a combiner in accordance with an exemplary embodiment of the present disclosure.
Figure 2:
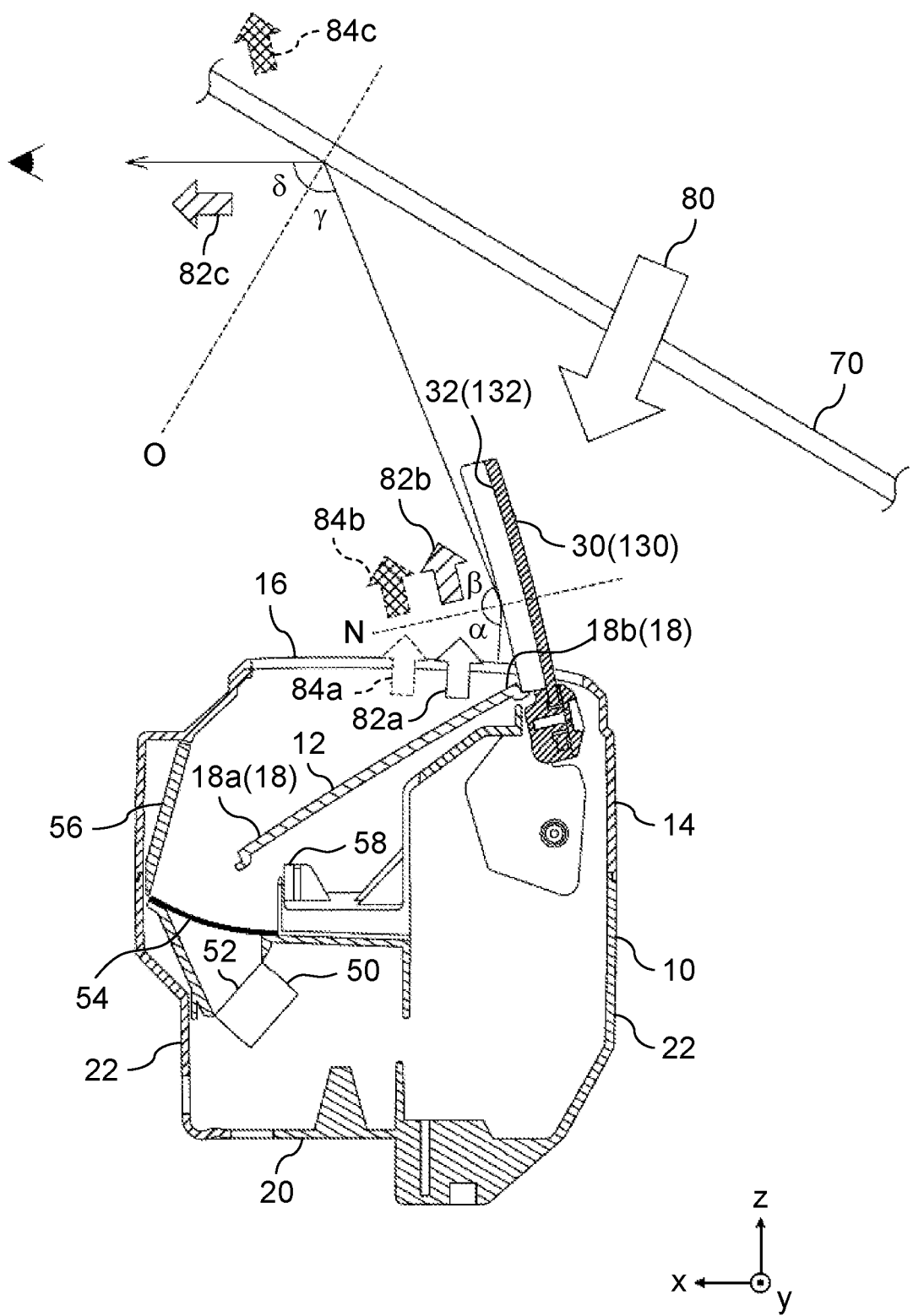
FIG. 2 is a cross-section view showing the structure of the head-up display device of FIG. 1.

FIG. 1 is an external view showing the structure of HUD device 100 in accordance with an exemplary embodiment. FIG. 2 is a cross-section view, taken along line 2-2 of FIG. 1, showing the structure of HUD device 100. As shown in FIG. 1 and FIG. 2, a Cartesian coordinate system having an x-axis, a y-axis, and a z-axis is defined. The x-axis and the y-axis orthogonally cross to each other in a plane that includes the bottom of HUD device 100. The z-axis is vertical to the x-axis and the y-axis and extends in the height direction of HUD device 100. Each positive direction of the x-axis, the y-axis, and the z-axis is defined to respective direction shown by the arrows in FIG. 1 and FIG. 2. The negative direction of each axis is opposite to the direction shown by each of the arrows. The positive direction of the z-axis means the upper-face side or the upper side, and the negative direction of the z-axis means the lower-face side or the lower side.

As shown in FIG. 2, HUD device 100 has housing 10, shielding cover 12, lid 14, combiner 30, display 50, transparent cover 54, reflecting member 56, and stopper 58. Housing 10 has bottom 20 and wall 22. Lid 14 has opening 16. Shielding cover 12 has first end part 18a and second end part 18b which are also referred as end parts 18. Display 50 has output plane 52. HUD device 100 is mounted, for example, on the instrumental panel (not shown) of a car, and combiner 30 shows an image. The instrumental panel is also called 'dashboard'. FIG. 1 and FIG. 2 show a state where combiner 30 is standing.

Housing 10 has bottom 20. Wall 22 is disposed on bottom 20 so as to extend from the edge of bottom 20 along the positive direction of the z-axis. The top of housing 10 is open into outside, and lid 14 (will be described below) is attached thereto. Housing 10 and lid 14 form a shell of HUD device 100. The shell accommodates shielding cover 12, combiner 30, display 50, transparent cover 54, reflecting member 56, and stopper 58.

Shielding cover 12 has first end part 18a disposed in the positive direction of the x-axis and second end part 18b disposed in the negative direction of the x-axis. Second end part 18b is fixed to housing 10, while first end part 18a is not fixed to anything. At least a part of shielding cover 12 is made of, for example, a flexible synthetic resin. By virtue of the flexibility, when a part close to first end part 18a is pressed along the negative direction of the z-axis, shielding cover 12 is deformed such that first end part 18a comes close to transparent cover 54.

Lid 14, which is disposed on the upper end of wall 22 of housing 10, partly covers the opened top of housing 10. Lid 14 has opening 16 at the center of its upper side, and combiner 30 protrudes through opening 16. FIG. 1 shows a state where lid 14 is removed.

Display 50 is, for example, a liquid crystal display; specifically, a 7-segment display. Display 50 outputs display light from output plane 52. The 7-segment display employs a single-colored segment LCD, for example. Output plane 52 is disposed with a tilt so that the display light from it goes into reflecting member 56. Transparent cover 54, which is disposed on the upper side of display 50 and on the lower side of shielding cover 12, covers output plane 52. Transparent cover 54 is formed of a transparent resin, for example. The display light fed from display 50 toward reflecting member 56 penetrates transparent cover 54. Transparent cover 54 protects display 50 from an object accidentally fallen into housing 10 through opening 16. Reflecting member 56 is a mirror and is disposed in the upper side of transparent cover 54. The display light fed from display 50 penetrates transparent cover 54. Reflecting member 56 reflects the light toward reflecting surface 32 of combiner 30.

As described earlier, combiner 30 is disposed to housing 10 so as to protrude through opening 16. Combiner 30 is, for example, a half mirror. Combiner 30 is formed of a resin-molded component and a semi-transmitting film, such as a dielectric multilayer, vapor-deposited on one surface of the resin-molded component. As the semi-transmitting film also serves as a reflection film, it is described in the description below as reflecting surface 32 that reflects incident light. Combiner 30 is semipermeable, which enables the driver to look ahead through combiner 30.

In the standing state of combiner 30, the display light emitted from display 50 reflects off reflecting member 56 and then comes to reflecting surface 32. At least a part of the light that hits reflecting surface 32 is reflected toward the driver. Through the structure, the driver sees the information projected on combiner 30 as if it overlaps with the view ahead through the windshield. The information as images shown to the driver includes the followings, for example: the current speed of the car, a remaining amount of the fuel, the distance to a destination, a traveling direction, the name of the present location, and names of neighboring facilities and shops.

Stopper 58 is disposed on the lower side of shielding cover 12. In FIG. 2, a clearance is disposed between first end part 18a and stopper 58. As described earlier, in a case where shielding cover 12 is deformed so that first end part 18a comes close to transparent cover 54, stopper 58 holds first end part 18a and prevents shielding cover 12 from being excessively deformed such that first end part 18a goes down further. If first end part 18a is lowered excessively, a large stress can be exerted onto a part to which second end part 18b is fixed, or first end part 18a can make contact with transparent cover 54. The support of stopper 58 also prevents the fixing part and transparent cover 54 from being damaged.

As shown in FIG. 2, sunlight 80 comes into the car through windshield 70. The workings of the device under the situation is described below. In the description below, combiner 130 is referred as a comparative combiner and combiner 30 is referred as the combiner of the exemplary embodiment.

On reflecting off shielding cover 12 or lid 14, sunlight 80 is separated into first S-wave component 82a and first P-wave component 84a. First S-wave component 82a is perpendicular to an incident plane while first P-wave component is parallel to the incident plane. The incident plane contains incident light that enters into combiner 30 (130) and reflecting light that reflects off combiner 30 (130). First S-wave component 82a and first P-wave component 84a enter into combiner 30 (130), having incident angle α of approximately 70° with respect to normal line N of combiner 30 (130).

When first S-wave component 82a and first P-wave component 84a are reflected by combiner 130 having comparative reflection characteristics, first S-wave component 82a becomes yellow second S-wave component 82b and first P-wave component 84a becomes blue second P-wave component 84b. At that time, second S-wave component 82b and second P-wave component 84b have reflection angle β of approximately 70° with respect to normal line N of combiner 30 (130).

Second S-wave component 82b and second P-wave component 84b enters windshield 70, having incident angle γ of approximately 70° with respect to normal line O of windshield 70. When the incident light has an incident angle of approximately 70°, windshield 70 has a reflectance of 41% for the S-wave component and has a reflectance of 7% for the P-wave component. Therefore, second P-wave component 84b mostly passes though windshield 70 as third P-wave component 84c in FIG. 2. When second S-wave component 82b hits windshield 70, third S-wave component 82c reflects off windshield 70, having reflection angle δ of approximately 70° with respect to normal line O of windshield 70. Like second S-wave component 82b, third S-wave component 82c is yellow, which is seen by the driver as yellow reflection.

In combiner 130, reflection characteristics of the S-wave component causes the yellow reflection. The reflection characteristics of the S-wave component is the result of designing combiner 130 with no consideration of reflection characteristics of incident light at an incident angle of approximately 70°. To reduce the yellow reflection, combiner 30 of the exemplary embodiment processes the reflected color of light having an incident angle of approximately 70° so as to be whitish. First, in order to describe the reflection characteristics of combiner 30, the reflection characteristics of combiner 130 which generates the yellow reflection will be described below.

FIG. 3A and FIG. 3B show reflection characteristics of combiner 130 as a comparative device to combiner 30. Specifically, FIG. 3A shows reflection characteristics at incident angle α of 0°. The reflection characteristics show a relation between reflectance with respect to incident light and wavelength of the incident light. In the wavelength range from 400 nm to 700 nm, inclusive, in the visible region (hereinafter, referred to the first wavelength range), peak P1 of the reflectance of the incident light has a wavelength of 440 nm. A wavelength range having a reflectance of 90% or more of peak P1 is from 420 nm to 710 nm, inclusive. A wavelength range having a reflectance of 80% or more of peak P1 is from 410 nm to 730 nm, inclusive.

FIG. 3B shows reflection characteristics at incident angle α of 70°. The reflection characteristics show a relation between reflectance with respect to the incident light and wavelength of the incident light. In the description, incident angle α of 0° is defined as a first value and incident angle α of 70° is defined as a second value; that is, the first value is smaller than the second value. In the first wavelength range, peak P2 of the reflectance of S-wave component 82 included in the incident light has a wavelength of 590 nm. The wavelength of peak P2 belongs to the wavelength range of yellow light that ranges from 570 nm to 590 nm, inclusive. A wavelength range having a reflectance of 90% or more of peak P2 is from 550 nm to 630 nm, inclusive. A wavelength range having a reflectance of 80% or more of peak P2 is from 530 nm to 650 nm, inclusive. In the first wavelength range, peak P3 of the reflectance of P-wave component 84 included in the incident light has a wavelength of 480 nm. The wavelength of peak P3 belongs to the wavelength range of blue light that ranges from 400 nm to 480 nm, inclusive. Due to the characteristics above, second S-wave component 82b becomes yellow and second P-wave component 84b becomes blue.

FIG. 3C shows the structure of a semi-transmitting film on reflecting surface 132 of combiner 130. The forming process of the semi-transmitting film is specifically described with reference to FIG. 3C. In the description below, the reference wavelength is assumed to be 500 nm. The semi-transmitting film is a dielectric multilayer film having seven layers. The seven layers are formed by vacuum deposition with the following materials layered from the side of a base member: the first layer of $SiO_2$ with a film thickness of 162 nm; the second layer of $Ta_2O_5$ with a film thickness of 101 nm; the third layer of $SiO_2$ with a film thickness of 115 nm; the fourth layer of $Ta_2O_5$ with a film thickness of 26 nm; the fifth layer of $SiO_2$ with a film thickness of 135 nm; the sixth layer of $Ta_2O_5$ with a film thickness of 47 nm; and the seventh layer of $SiO_2$ with a film thickness of 120 nm. Taking difference in refractive index of $SiO_2$ and $Ta_2O_5$ into account, the film is formed of alternately layered $SiO_2$ and $Ta_2O_5$. A desired reflection characteristic is obtained by changing the film thickness of each layer and the number of layers. As for combiner 30 having reflection characteristics shown in FIG. 4A, FIG. 4B, FIG. 5A, and FIG. 5B, a semi-transmitting film is formed on reflecting surface 32. In the forming process, each layer is formed while being monitored the reflectance of an optical monitor glass disposed at the center of a deposition dome. When the reflectance of the optical monitor glass reaches a desired value (corresponding to a desired film thickness), the deposition process is stopped. Such structured semi-transmitting film has reflection characteristics to incident light at an incident angle of 0° shown in FIG. 3A and FIG. 3B.

Next, an example of the reflection characteristics of combiner 30 is described, with reference to FIG. 4A and FIG. 4B. Each of FIG. 4A and FIG. 4B shows an example where the average reflectance of the first wavelength range is set to 30%. Setting the average reflectance to 30% allows the driver to have increased visibility through the combiner. Generally, the lower the average reflectance, the higher the transparence of the combiner, which means enhanced visibility of the driver; on the other hand, the lower the average reflectance, the more increase the necessity of the illumination intensity for a liquid crystal display (hereinafter, LCD). An image shown by the LCD of the display is projected on the combiner to obtain a virtual image. Under the state with lowered average reflectance, the LCD has to be illuminated by intense light to maintain sufficient brightness of the virtual image to be formed on the combiner. For example, display 50 is formed of a blue LED (light emitting diode). Increasing illumination light for the LCD increases the current value of the LED, further increasing the cost of the LED driver. Besides, such a device tends to have a large housing for sufficient heat dissipation. Considering above condition, the average reflectance is preferably 30% or greater when the device has a sufficient heat dissipation performance.

FIG. 4A shows reflection characteristics at incident angle α of 0°. The reflection characteristics show a relation between reflectance with respect to incident light and wavelength of the incident light. In the first wavelength range, peak P1' of the reflectance of the incident light has a wavelength of 610 nm. A wavelength range having a reflectance of 90% or more of peak P1' is from 380 nm to 690 nm, inclusive (hereinafter, this range is referred to as the second wavelength range). A wavelength range having a reflectance of 80% or more of peak P1' is from 380 nm to 710 nm, inclusive (hereinafter, this range is referred to as the third wavelength range). Therefore, the upper-limit wavelength of the second wavelength range is shorter than the upper-limit wavelength of the wavelength range having a reflectance of 90% or more of peak P1. Further, the upper-limit wavelength of the third wavelength range is shorter than the upper-limit wavelength of the wavelength range having a reflectance of 80% or more of peak P1.

FIG. 4B shows reflection characteristics at incident angle α of 70°. The reflection characteristics show a relation between reflectance with respect to the incident light and wavelength of the incident light. In the first wavelength range, peak P2' of the reflectance of S-wave component 82 included in the incident light has a wavelength of 540 nm, which is shorter than the lower-limit wavelength of the wavelength range of yellow light that ranges from 570 nm to 590 nm, inclusive. A wavelength range having a reflectance of 90% or more of peak P2' of S-wave component 82 is from 480 nm to 610 nm, inclusive. A wavelength range having a reflectance of 80% or more of peak P2' of S-wave component 82 is from 460 nm to 650 nm, inclusive. As described above, the upper-limit wavelength of the wavelength range having a reflectance of 90% or more of peak P2' is shorter than 620 nm. On the other hand, in the first wavelength range, peak P3' of the reflectance of P-wave component 84 included in the incident light has a wavelength of 400 nm, which equals to the lower-limit wavelength of the wavelength range of blue light that ranges from 400 nm to 480 nm, inclusive. The characteristics above allows not only second S-wave component 82b to have less yellow component but also second P-wave component 84b to have less blue component.

Combiner 30 having the characteristics shown in FIG. 4A and FIG. 4B has a base member made of an optical resin (ne=1.53). After the base member is injection-molded, a semi-transmitting film is formed on a surface of the base member as reflecting surface 32. Hereinafter, the forming process of the semi-transmitting film is described in detail with reference to FIG. 4C. FIG. 4C shows the structure of the semi-transmitting film of combiner 30. In the description below, the reference wavelength is assumed to be 500 nm. The semi-transmitting film is a dielectric multilayer film having five layers. The five layers are formed by vacuum deposition with the following materials layered from the side of the base member: the first layer of $SiO_2$ with a film thickness of 402 nm; the second layer of $Ta_2O_5$ with a film thickness of 54 nm; the third layer of $SiO_2$ with a film thickness of 81 nm; the fourth layer of $Ta_2O_5$ with a film thickness of 57 nm; and the fifth layer of $SiO_2$ with a film thickness of 78 nm. Such structured semi-transmitting film has reflection characteristics at an incident angle of 0° shown in FIG. 4A. The reflection characteristics show an average reflectance of 30% in the first wavelength range. Further, the S-wave has a reflected color of white when incident light at an incident angle of 70° hits the semi-transmitting film according to FIG. 4B.

Each of FIG. 5A and FIG. 5B shows reflection characteristics of another example in which the average reflectance of the first wavelength range is set to 35%. From the point of the cost of the LED driver and/or in a case where it is difficult to ensure a sufficient heat dissipation performance, the average reflectance is preferably set to 35%. This is because setting the average reflectance to 35% allows the combiner to have enough brightness without increasing the cost of the LED driver and without deteriorating the heat dissipation performance. Besides, compared to the case in which the average reflectance is determined to 30%, setting the average reflectance to 35% decreases the probability of lack of brightness caused by lack of the current value of the LED.

FIG. 5A shows reflection characteristics at incident angle α of 0°. The reflection characteristics show a relation between reflectance with respect to incident light and wavelength of the incident light. In the first wavelength range, peak P1" of the reflectance of the incident light has a wavelength of 550 nm. A wavelength range having a reflectance of 90% or more of peak P1" is from 470 nm to 640 nm, inclusive. A wavelength range having a reflectance of 80% or more of peak P1" is from 450 nm to 670 nm, inclusive. That is, both the wavelength ranges above-having a reflectance of 90% or more and 80% or more of the peak—have the upper-limit wavelength shorter than 700 nm. The upper-limit wavelength of the wavelength range having a reflectance of 90% or more of the peak value of reflectance is shorter than the upper-limit wavelength of the comparative example; similarly, the upper-limit wavelength of the wavelength range having a reflectance of 80% or more of the peak value of reflectance is shorter than the upper-limit wavelength of the comparative example. Further, the lower-limit wavelength of the wavelength range having a reflectance of 90% or more of the peak value of reflectance is longer than 460 nm. Furthermore, the wavelength range having a reflectance of 90% or more of the peak value of reflectance is narrower than the wavelength range of the comparative example. Similarly, the wavelength range having a reflectance of 80% or more of the peak value of reflectance is narrower than the wavelength range of the comparative example.

FIG. 5B shows reflection characteristics at incident angle α of 70°. The reflection characteristics show a relation between reflectance with respect to the incident light and wavelength of the incident light. In the first wavelength range, peak P2" of the reflectance of S-wave component 82 included in the incident light has a wavelength of 500 nm, which is shorter than the lower-limit wavelength of the wavelength range of yellow light that ranges from 570 nm to 590 nm, inclusive. A wavelength range having a reflectance of 90% or more of peak P2" of S-wave component 82 is from 410 nm to 580 nm, inclusive. A wavelength range having a reflectance of 80% or more of peak P2" is from 390 nm to 610 nm, inclusive. That is, the upper-limit wavelength of the wavelength range having a reflectance of 90% or more of the peak value is shorter than 620 nm. In contrast, P-wave component 84 of the incident light has no reflectance peak in the first wavelength range. The characteristics above allows not only second S-wave component 82b to have less yellow component but also second P-wave component 84b to have less blue component.

As described above, FIG. 5A and FIG. 5B shows the case in which the average reflectance of the first wavelength range is determined to 35%. Hereinafter, the characteristics further added to combiner 30 in the aforementioned case is described. As shown in FIG. 5A, the reflectance decreases in the wavelength range of blue light (ranging from 400 nm to 480 nm, inclusive) and in the wavelength range of red light (ranging from 620 nm to 700 nm, inclusive). Accordingly, a blue component and a red component of sunlight 80 easily pass through combiner 30. Thus, the driver's eyes catch the light tinged with purple as a mixture of the blue and the red components from combiner 30. At that time, it is preferable that the material of combiner 30 has an average transmittance in the wavelength range of green light (ranging from 495 nm to 570 nm, inclusive) is higher not only than an average transmittance of the wavelength range from 400 nm to 495 nm, inclusive, but also than the average transmittance of the wavelength range from 570 nm to 700 nm, inclusive. By virtue of the average transmittance above, the green component of sunlight 80 easily passes through combiner 30 as well. As a result, the driver's eyes catch white light as a mixture of the purple light and the green light. In this way, the light from combiner 30 is controlled so as not to be tinged with purple.

The average transmittance of at least reflecting surface 32 of combiner 30 in the wavelength range of green light (ranging from 495 nm to 570 nm, inclusive) may be higher not only than the average transmittance of the wavelength range from 400 nm to 495 nm, inclusive, but also than the average transmittance of the wavelength range from 570 nm to 700 nm, inclusive. By virtue of the average transmittance above, the green component of sunlight 80 easily passes through combiner 30 as well. As a result, the driver's eyes catch white light as a mixture of the purple light and the green light. In this way, the light from combiner 30 is controlled so as not to be tinged with purple.

As shown in FIG. 5A, light having a wavelength that belongs to the wavelength range of green light (ranging from 495 nm to 570 nm, inclusive) or the wavelength range of yellow light (ranging from 570 nm to 590 nm, inclusive) has an increased reflectance. As described earlier, the display light from display 50 comes into combiner 30. Accordingly, an increased amount of the green component and the yellow component is contained in the display light reflected by combiner 30, so that a green-yellow virtual image is seen by the driver. In such a green-yellow virtual image, blue color is weakened. Therefore, it is preferable that the intensity of the display light in the wavelength range of blue light ranging from 400 nm to 480 nm, inclusive, is increased. To be specific, display 50 outputs display light in which the light intensity is controlled as described above.

Combiner 30 having the characteristics shown in FIG. 5A and FIG. 5B has a base member made of an optical resin (ne=1.53). After the base member is injection-molded, a semi-transmitting film is formed on a surface of the base member as reflecting surface 32. Hereinafter, the forming process of the semi-transmitting film is described in detail with reference to FIG. 5C. FIG. 5C shows the structure of the semi-transmitting film of combiner 30. In the description below, the reference wavelength is assumed to be 500 nm. The semi-transmitting film is a dielectric multilayer film having five layers. The five layers are formed by vacuum deposition with the following materials layered from the side of the base member: the first layer of $SiO_2$ with a film thickness of 191 nm; the second layer of $Ta_2O_5$ with a film thickness of 53 nm; the third layer of $SiO_2$ with a film thickness of 91 nm; the fourth layer of $Ta_2O_5$ with a film thickness of 52 nm; and the fifth layer of $SiO_2$ with a film thickness of 55 nm. Such structured semi-transmitting film has reflection characteristics at an incident angle of 0° shown in FIG. 5A. The reflection characteristics show an average reflectance of 35% in the first wavelength range. Further, the S-wave has a reflected color of white when incident light at an incident angle of 70° hits the semi-transmitting film according to FIG. 5B.

The semi-transmitting films of FIG. 3C, FIG. 4C, and FIG. 5C have similar layered structures of $SiO_2$ layers and $Ta_2O_5$ layers but have different reflection characteristics. That is, changing the number of layers and the thickness of each layer allows the semi-transmitting film to have different reflection characteristics.

FIG. 3A and FIG. 5A show reflectance characteristic with respect to the incident light at an incident angle of 0°. Compared to FIG. 3A, the graph of FIG. 5A shows large difference in reflectance with respect to wavelength, and a clear peak in the visible wavelength range. Compared to FIG. 3A, the graph of FIG. 4A shows reflectance that starts to decrease from around 630 nm. According to the embodiment, the design of a semi-transmitting film puts weight on obtaining desired reflection characteristics at an incident angle of 70°, making some degree of sacrifice on reflection characteristics at an incident angle of 0°.

As described above, combiner 30 of the exemplary example has the structure in which, as for incident light at an incident angle of 0°, the upper-limit wavelength of the wavelength range having a reflectance of 90% or more of the peak value of reflectance is shorter than 700 nm; and as for incident light at an incident angle of 70°, the peak of the reflectance of S-wave component has a wavelength shorter than the lower-limit wavelength of the wavelength range of yellow light. The structure of combiner 30 allows the light having a wavelength shorter than yellow light to have increase in amount of reflection, which decreases reflection of yellow light. That is, decrease in reflection of yellow light means that reflection of colored light is decreased. As for incident light at an incident angle of 70°, the upper-limit wavelength of the wavelength range having a reflectance of 90% or more of the peak value of reflectance of the S-wave component is shorter than 620 nm, thereby decreasing yellow component contained in the reflected wave.

As for incident light at an incident angle of 0° of combiner 30, the lower-limit wavelength of the wavelength range having a reflectance of 90% or more of the peak value of reflectance is longer than 460 nm, which narrows the wavelength range having a reflectance of 90% or more of the peak value of reflectance. This allows reflection characteristics at an incident angle of 70° to be changed. Besides, with the structure above, a green component contained in sunlight easily passes through combiner 30. As a result, the driver's eyes catch white light as a mixture of the purple light and the green light. In this way, the light from combiner 30 is controlled so as not to be tinged with purple.

Further, at least on the reflecting surface of combiner 30, the transmittance of a wavelength range of green light is set to be higher than the transmittance on the range lower than the wavelength range and the transmittance on the range upper than the wavelength range. As a result, the driver's eyes catch white light as a mixture of the purple light and the green light. In this way, the light from combiner 30 is controlled so as not to be tinged with purple. Enhancing intensity in the wavelength range of blue light in the display light allows a virtual image to have increase in blue color complementarily. This provides the virtual image with being less green-yellow.

So far, taking some examples, the structure of the embodiment has been described. These are merely examples, and it is apparent to those skilled in the art that changes and modifications may be made for combining components or processes without departing from the scope of the present disclosure.

In the examples, the first value is assumed to be 0° and the second value is assumed to be 70°. The first value means a reflection angle of the image of the HUD device when incident light comes from a direction confronting to the device; it practically ranges from 0° to 25°, inclusive, for example. The second value means a reflection angle when sunlight reflects on the HUD device disposed on a generally intended position; it practically ranges from 60° to 85°, inclusive, for example. In this way, the variation example of the embodiment allows combiner 30 to have flexibly determined characteristics.

Although the embodiment describes that combiner 30 is included in HUD device 100, it is not limited to; combiner 30 may be separated from HUD device 100. In that case, combiner 30 may receive the display light fed from the display of a smartphone. In this way, the variation example of the embodiment increases the degree of flexibility in structure.

According to the embodiment, combiner 30 is formed of a resin-molded member over which a reflection film having reflecting surface 32 is deposited; however, it is not limited to. A reflection film having reflecting surface 32 may be independently formed as a film, and then the film may be attached to the resin-molded member to form combiner 30. In the structure above, the reflection characteristics of combiner 30 correspond to the reflection characteristics of the film. In this way, the variation example of the embodiment increases the degree of flexibility in structure.

An aspect of the present disclosure is outlined as follows. The combiner of the aspect of the present disclosure has a reflecting surface that reflects incident light and satisfies the two conditions below:

(1) when a first value is given to an incident angle that is defined as an angle formed between the normal line of the reflecting surface and incident light, in a first wavelength range from 400 nm to 700 nm, inclusive, the average value of reflectance of the incident light is 30% or greater, and the upper-limit wavelength of a second wavelength range having a reflectance of 90% or more of the reflectance peak of the incident light is shorter than 700 nm; and (2) when a second value larger than the first value is given to the incident angle, in the wavelength range of visible light from 400 nm to 700 nm, inclusive, the reflectance peak of the S-wave component contained in the incident light has a wavelength shorter than 570 nm that corresponds the lower-limit value of the wavelength range of yellow light.

According to the aspect, when the incident angle takes the first value, the upper-limit wavelength of the second wavelength range is shorter than 700 nm; and when the incident angle takes the second value, the wavelength of the reflectance peak of the S-wave component is shorter than the lower-limit wavelength of the wavelength range of yellow light. Such structured combiner decreases reflection of colored light.

When the incident angle takes the second value, in the first wavelength range, the upper-limit wavelength of the wavelength range having a reflectance of 90% or more of the reflectance peak of the S-wave component included in incident light may be shorter than 650 nm. The aforementioned upper-limit wavelength is shorter than 650 nm; more exactly shorter than 620 nm, thereby decreasing a yellow component contained in the reflected light.

When the incident angle takes the first value, in the first wavelength range, the lower-limit wavelength of the wavelength range having a reflectance of 90% or more of the reflectance peak of incident light may be longer than 450 nm. The aforementioned lower-limit wavelength is longer than 450 nm; more exactly longer than 460 nm. This makes the wavelength range narrow, allowing the reflection characteristics at an incident angle of the second value to be changed.

The average transmittance of at least the reflecting surface of the combiner in the wavelength range that ranges from 495 nm to 570 nm, inclusive, may be greater than the average transmittance of the following two ranges: the wavelength range that ranges from 400 nm to 495 nm, inclusive; and the wavelength range that ranges from 570 nm to 700 nm, inclusive. In this case, a green component contained in sunlight easily passes through the combiner. As a result, the driver's eyes catch white light as a mixture of the purple light and the green light. In this way, the light from combiner 30 is controlled so as not to be tinged with purple.

In another aspect, the present disclosure provides a head-up display device. The device has a display that emits display light, a reflecting member that reflects the display light, and a combiner into which light reflected off the reflecting member is fed as incident light. The combiner has a reflecting surface that reflects the incident light, and it satisfies the following two conditions:

(1) when a first value is given to an incident angle that is defined as an angle formed between the normal line of the reflecting surface and incident light, in a first wavelength range from 400 nm to 700 nm, inclusive, the average value of reflectance of the incident light is 30% or greater, and the upper-limit wavelength of a second wavelength range having a reflectance of 90% or more of a reflectance peak of the incident light is shorter than 700 nm; and (2) when a second value larger than the first value is given to the incident angle, in the first wavelength range, the reflectance peak of the S-wave component contained in the incident light has a wavelength shorter than 570 nm.

According to this aspect, when the incident angle takes the first value, the upper-limit wavelength of the second wavelength range is shorter than 700 nm. Besides, when the incident angle takes the second value, the reflectance peak of the S-wave component has a wavelength shorter than the lower-limit wavelength of the wavelength range of yellow light. The structure thus decreases reflection of colored light.

In display light, average intensity of light belonging to the wavelength range from 400 nm to 480 nm, inclusive, may be greater than average intensity of light belonging to the wavelength range from 480 nm to 700 nm, inclusive. In this case, intensity of the display light in the wavelength range of blue light is enhanced, allowing blue color in a virtual image to be added complementarily.

The display may be a single-colored segment LCD. This allows the display to have a simple structure.

The present disclosure relates to a combiner and is applicable to a combiner that reflects a part of incident light, and a head-up display device equipped with the combiner.

What is claimed is:

1. A combiner having a reflecting surface that reflects incident light, wherein, (1) when a first value in a range from 0° to 25°, inclusive, is given to an incident angle defined as an angle formed between a normal line of the reflecting surface and the incident light, in a first wavelength range from 400 nm to 700 nm, inclusive, an average value of reflectance of the incident light is 30% or greater, and an upper-limit wavelength of a second wavelength range having a reflectance of 90% or more with respect to a reflectance peak of the incident light is shorter than 700 nm; and (2) when a second value in a range from 60° to 85°, inclusive, is given to the incident angle, in the first wavelength range, a reflectance peak of an S-wave component contained in the incident light has a wavelength shorter than 570 nm.

2. The combiner according to claim 1, wherein, when the incident angle takes the second value, an upper-limit wavelength of a wavelength range having a reflectance of 90% or more of the reflectance peak of the S-wave component included in the incident light is shorter than 650 nm.

3. The combiner according to claim 1, wherein a lower-limit wavelength of the second wavelength range is longer than 450 nm.

4. The combiner according to claim 3, wherein an average transmittance of at least the reflecting surface of the combiner in a wavelength range from 495 nm to 570 nm, inclusive, is greater not only than an average transmittance of at least the reflecting surface of the combiner in a wavelength range from 400 nm to 495 nm, inclusive, but also than an average transmittance of at least the reflecting surface of the combiner in a wavelength range from 570 nm to 700 nm, inclusive.

5. A head-up display device comprising:
a display that emits display light;
a reflecting member that reflects the display light; and
the combiner of claim 1 into which reflection light reflected by the reflecting member is fed as incident light.

6. The head-up display device according to claim 5, wherein, when the incident angle takes the second value, an upper-limit wavelength of a wavelength range having a reflectance of 90% or more of the reflectance peak of the S-wave component included in incident light is shorter than 650 nm.

7. The head-up display device according to claim 5, wherein a lower-limit wavelength of the second wavelength range is longer than 450 nm.

8. The head-up display device according to claim 7, wherein an average transmittance of at least the reflecting surface of the combiner in a wavelength range from 495 nm to 570 nm, inclusive, is greater not only than an average transmittance of at least the reflecting surface of the combiner in a wavelength range from 400 nm to 495 nm, inclusive, but also than an average transmittance of at least the reflecting surface of the combiner in a wavelength range from 570 nm to 700 nm, inclusive.

9. The head-up display device according to claim 7, wherein average intensity of the display light fed from the display in a wavelength range from 400 nm to 480 nm, inclusive, is greater than average intensity of the display light in a wavelength range from 480 nm to 700 nm, inclusive.

10. The head-up display device according to claim 5, wherein the display is a single-colored segment liquid crystal display.

* * * * *